United States Patent
Lind

(10) Patent No.: US 8,684,672 B2
(45) Date of Patent: Apr. 1, 2014

(54) BRAKE SYSTEM WITH EXPANSION ABSORBING MEANS, GENERATOR AND WIND TURBINE

(75) Inventor: Soeren Oemann Lind, Næstved (DK)

(73) Assignee: Siemens Aktiengesellschaft, Munich (DE)

( * ) Notice: Subject to any disclaimer, the term of this patent is extended or adjusted under 35 U.S.C. 154(b) by 517 days.

(21) Appl. No.: 12/941,393

(22) Filed: Nov. 8, 2010

(65) Prior Publication Data

US 2011/0123338 A1 May 26, 2011

(30) Foreign Application Priority Data

Nov. 26, 2009 (EP) .................................... 09014764

(51) Int. Cl.
*F03D 11/00* (2006.01)
(52) U.S. Cl.
USPC ........................ 415/123; 415/138; 416/169 R
(58) Field of Classification Search
USPC ......... 415/4.1, 4.3, 4.5, 124.2, 123, 134, 135, 415/138, 136; 416/169 R
See application file for complete search history.

(56) References Cited

U.S. PATENT DOCUMENTS 5,950,772 A * 9/1999 Buckley et al. ................. 188/26
7,431,567 B1 10/2008 Bevington

FOREIGN PATENT DOCUMENTS

| CN | 101427023 A | 5/2009 |
| DE | 4402184 A1 | 8/1995 |
| EP | 1925820 A1 | 5/2008 |
| GB | 1 417 843 A | 12/1975 |
| KR | 100906992 B1 | 3/2009 |
| KR | 2009 0055714 A | 6/2009 |
| WO | WO 2008/009246 A1 | 1/2008 |

* cited by examiner

*Primary Examiner* — Edward Look
*Assistant Examiner* — Juan G Flores

(57) ABSTRACT

A brake system comprising a brake disc is disclosed. The brake system comprises at least one flexible portion. The at least one flexible portion is configured for compensating expansion of the brake disc and/or absorbing the expansion of the brake disc. The brake system is especially for a wind turbine generator.

12 Claims, 9 Drawing Sheets

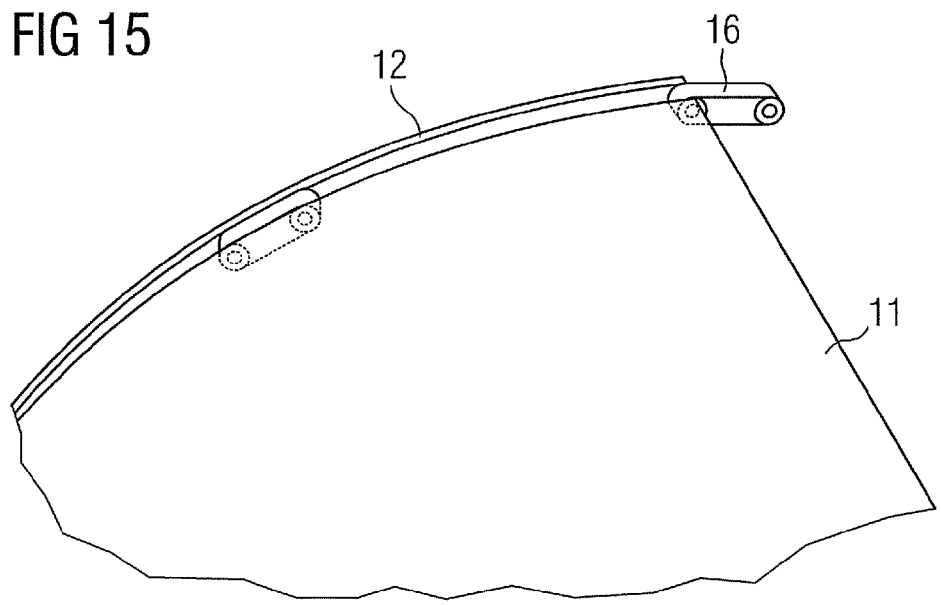
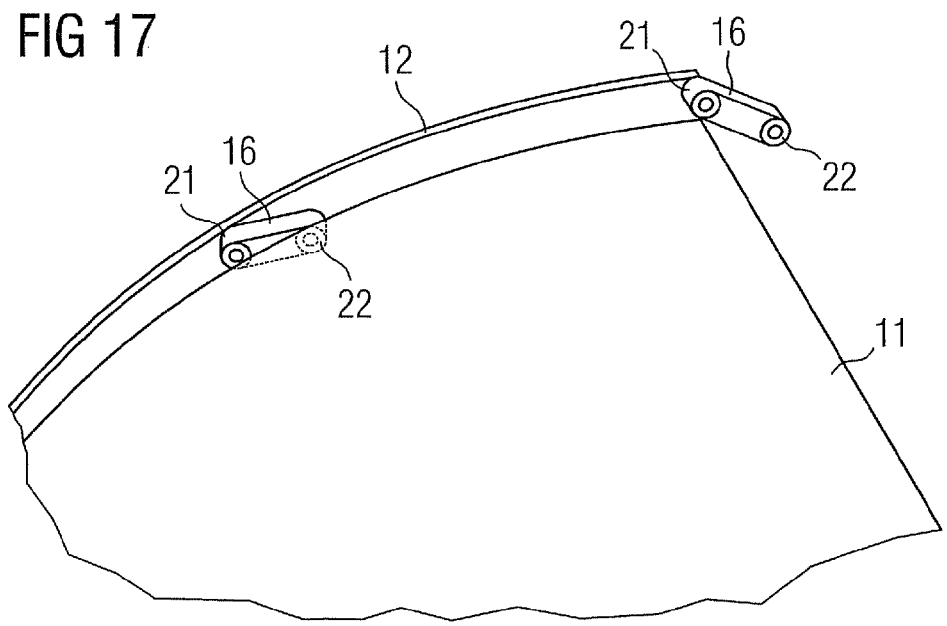

BRAKE SYSTEM WITH EXPANSION ABSORBING MEANS, GENERATOR AND WIND TURBINE

CROSS REFERENCE TO RELATED APPLICATIONS

This application claims priority of European Patent Office application No. 09014764.6 EP filed Nov. 26, 2009, which is incorporated by reference herein in its entirety.

FIELD OF THE INVENTION

The present invention relates to a brake system, especially for a generator, with expansion absorbing means, a generator and a wind turbine

BACKGROUND OF THE INVENTION

On a wind turbine with a disc brake attached to the generator, or alternatively to the hub, thermal expansion in the brake disc or an other component of the brake system may occur during operation. The components of the brake system may be exposed to mechanical stress coursed by different thermal expansion, for example in the disc brake and the generator or the hub.

Up to now, disc brakes on geared turbines have been positioned on the rotating shaft of the wind turbines. When building direct drive turbines without rotating shafts the disc brake will need to be mounted on the generator, or on the turbine hub. Typically, the disk brake will heat up during use, and for that reason the thermal expansion will generate reaction forces. Also during normal operation, different temperature between generator and disc brake can generate reaction forces.

SUMMARY OF THE INVENTION

Therefore it is a first objective of the present invention to provide an advantageous brake system, which reduces stress in the adjacent component. It is a second objective to provide an advantageous generator. A third objective of the present invention is to provide an advantageous wind turbine.

The objectives are solved by a brake system, a generator and a wind turbine as claimed in the independent claims. The depending claims define further developments of the invention.

The inventive brake system comprises a brake disc. The brake system further comprises at least one flexible portion. The flexible portion is configured for compensating and/or absorbing expansions of the brake disc. The inventive brake system is especially suitable for a generator.

Preferably, the at least one flexible portion is a thermal expansion absorbing means. For example, the at least one flexible portion may comprise a bending portion, a spring portion or another expansion absorbing means.

An advantage of the present invention is, that it reduces or eliminates stress in the adjacent component, which may be a generator or hub structure, coursed by thermal expansion of the brake disc.

The flexible portion can be realised by either construct the brake disc in a way that allow it to absorb the thermal expansion itself, or by fixing the brake disc to an adjacent structure, which may be a generator structure or a hub structure, by means of a mechanism that eliminates radial forces being generated. For example, the at least one flexible portion may be connected to the brake disc or the brake disc can comprise the flexible portion. The flexible portion can especially be in integrated part of the brake disc.

The inventive brake system may comprise rotor assembly which may, for instance, comprise a rotor yoke. The brake disc may be connected to the rotor yoke by means of a flexible joint. Additionally or alternatively a flexible portion of the brake disc may be connected to the rotor yoke.

Moreover, the brake system may comprise a rotor assembly, a stator assembly and a rotation axis. The rotor assembly may comprise an outer portion which is located radially outward of the stator assembly. The outer portion may comprise the brake disc. The stator assembly may further comprise at least one frictional member. The frictional member may be operatively configured for frictionally engaging at least a portion of a brake disc. The frictional member may comprises a brake calliper. The rotor yoke may be part of the outer portion of the rotor assembly. The inventive brake system may especially be used for a generator. It may, for example, be part of a generator or be connected to a generator.

The inventive brake system has the advantage, that the brake disc can be mounted on a cylindrical support structure of an outer rotor. In this case the possible large diameter of the machine can be fully used in order to use a brake disc with largest possible diameter. This increases the efficiency of the brake. Moreover, a bigger brake disc and bigger brake callipers can be used which provides a larger effective contact surface. A large effective contact surface is necessary in order to maintain the rotor in a parking position, for example. A further advantage is that more heat can be absorbed and distributed in a large brake disc compared with smaller brake discs.

Generally, the inventive brake system can be part of a direct drive generator or it can be connected to a direct drive generator. The generator may have an outer rotor configuration.

Advantageously the brake disc may extend radially inward from the outer portion of the rotor assembly to the rotation axis. In this case the inventive brake system can be used for a direct drive generator. Furthermore, the inventive brake system may be part of a direct drive wind turbine with an outer rotor configuration.

Moreover, the rotor assembly may comprise a flange. The brake disc may be fastened to the flange. For example, the flange may comprise a number of holes, preferably bolt holes. The holes may be radially spaced. Preferably the brake disc is fastened to the flange by bolts or screws.

The brake system may be part of a wind turbine with a hub. In this case the brake system, especially the rotor assembly of the brake system, may comprise a near end which faces the hub and a far end which is located opposite to the hub. Preferably the flange, to which the brake disc is fastened, may be located at the fast end of the rotor assembly, which means opposite of the hub. This provides easy access to the brake system, especially for maintenance and sevice.

The inventive brake system may comprise a rotor support. In this case the brake disc may be fastened to a flange of the rotor support, for example by bolts or screws.

The stator assembly may comprise a stationary shaft. The at least one frictional member may be connected to the stationary shaft. For example, the at least one frictional member, for example at least one brake calliper, may be directly mounted to the stationary shaft.

Preferably the at least one frictional member may extend radially outward regarding the rotation axis. For example, the at least one frictional member may extend radially outward from the stationary shaft of a wind turbine.

Especially, the frictional member may comprise at least one brake calliper. Preferably the frictional member comprises at least one brake calliper on each side of the brake disc, preferably in order to enclose the brake disc. Advantageously the at least one frictional member comprises at least one brake calliper system. The at least one calliper system may comprise at least to brake callipers located on each side of the brake disc opposite to each other. For example, the brake calliper system may comprise at least one calliper bracket. The calliper bracket may be used for mounting the callipers and/or the brake calliper system to another component of the brake system, for example for mounting to the stationary shaft. Each brake calliper system may be connected to a calliper bracket.

The inventive generator comprises an inventive brake system as previously described. The inventive generator has the same advantages as the inventive brake system.

The inventive wind turbine comprises an inventive brake system as previously described. The inventive wind turbine has the same advantageous as the inventive brake system. Preferably the inventive wind turbine may be a direct drive wind turbine. Moreover, the inventive wind turbine may comprise an outer rotor configuration.

The inventive wind turbine may comprise a nacelle, a hub and a generator. The generator may be located inside the nacelle or between the nacelle and the hub. The brake system may be connected to the generator and/or to the hub. For example, the brake system may be an integrated part of the generator and/or an integrated part of the hub.

Generally, the present invention eliminates or reduces the stress in the brake disc and in the generator structure, if the brake disc is attached to the generator. If attached to the hub, the flexible portion will have the same effect on the hub structures.

BRIEF DESCRIPTION OF THE DRAWINGS

Further features, properties and advantages will become clear from the following description of embodiments in conjunction with the accompanying drawings. All features are advantageous alone or in combination with each other.

FIG. 15 schematically shows part of the outer rotor portion of the inventive brake system of FIG. 14 in a perspective view.

FIG. 17 schematically shows the outer rotor portion of FIG. 16 in a perspective view.

DETAILED DESCRIPTION OF THE INVENTION

A first embodiment of the present invention will now be described with reference to FIGS. 1 to 3 and 5 to 13.

Figure 1:
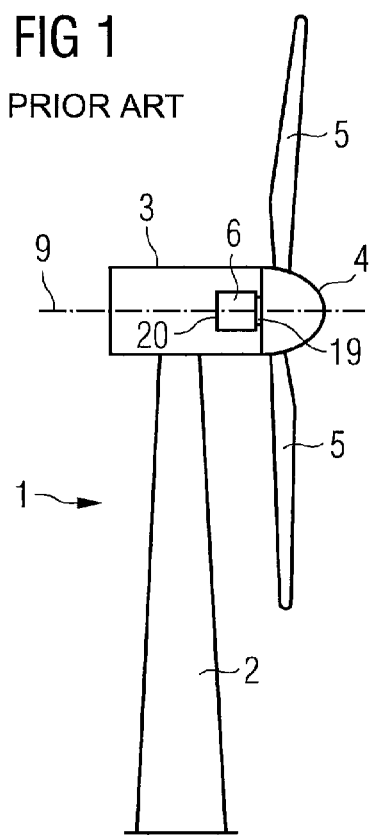
FIG. 1 schematically shows a wind turbine.

FIG. 1 schematically shows a wind turbine 1. FIG. 1 schematically shows a wind turbine 1. The wind turbine 1 comprises a tower 2, a nacelle 3 and a hub 4. The nacelle 3 is located on top of the tower 2. The hub 4 comprises a number of wind turbine blades 5. The hub 4 is mounted to the nacelle 3. Moreover, the hub 4 is pivot-mounted such that it is able to rotate about a rotation axis 9. A generator 6 is located inside the nacelle 3. The wind turbine 1 is a direct drive wind turbine. The generator 6 comprises a near side 19 facing the hub 4 and a far side 20 opposite to the hub 4.

Figure 2:
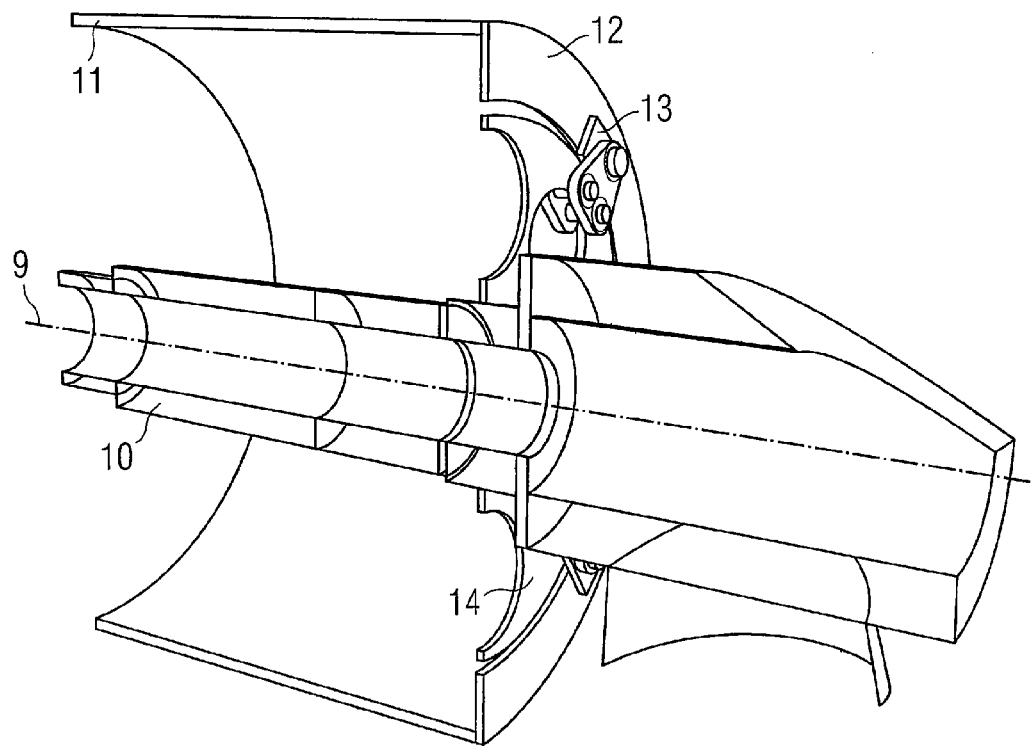
FIG. 2 schematically shows part of a conventional brake system in a perspective view.

FIG. 2 schematically shows part of a conventional rotor brake system of a generator 6 in a perspective view. The rotor brake system of the generator 6 comprises a stationary shaft 10 which is located close to the rotation axis 9. The generator 6 comprises a rotor assembly. The rotor assembly comprises an outer rotor portion 11. The outer rotor portion 11 is located radially outward of the stationary shaft 10.

The outer rotor portion 11 comprises a brake disc 12. The brake disc 12 extends radially inward from the outer rotor portion 11 of the rotor assembly to the rotation axis 9. Alternatively, the brake disc 12 can be mounted to the outer rotor portion 11. The outer rotor portion 11 may be a rotor yoke.

The brake system further comprises a brake calliper system 13. The brake calliper system 13 is connected to the stationary shaft 10 by means of a central mounted flange 14. Preferably the brake system comprises a number of brake calliper systems 13. Advantageously the brake calliper systems 13 are located uniformly spaced around the circumference of the brake disc 12.

The brake calliper system 13 is operatively configured for frictionally engaging at least a portion of the brake disc 12. Preferably the brake calliper system 13 extends radially outward from the stationary shaft 10. Advantageously, the brake calliper system 13 comprises at least one brake calliper on each side of brake disc.

Figure 5:
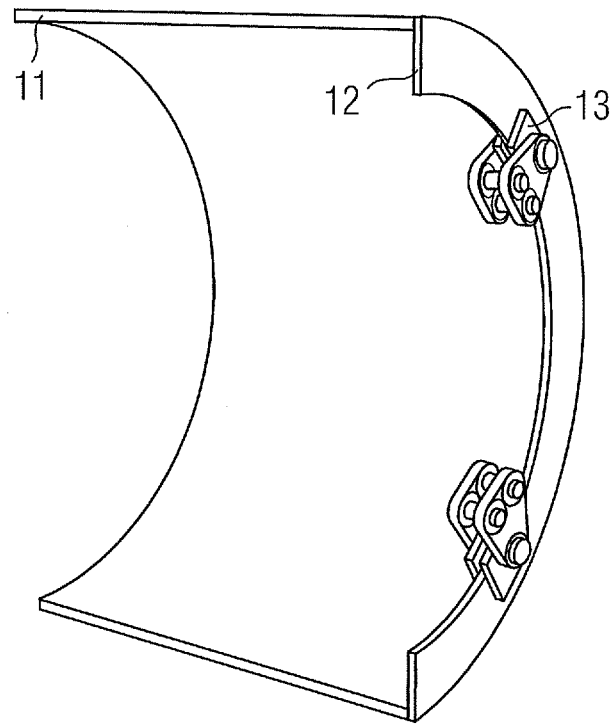
FIG. 5 schematically shows part of the outer rotor portion in a neutral state in a perspective view.
Figure 6:
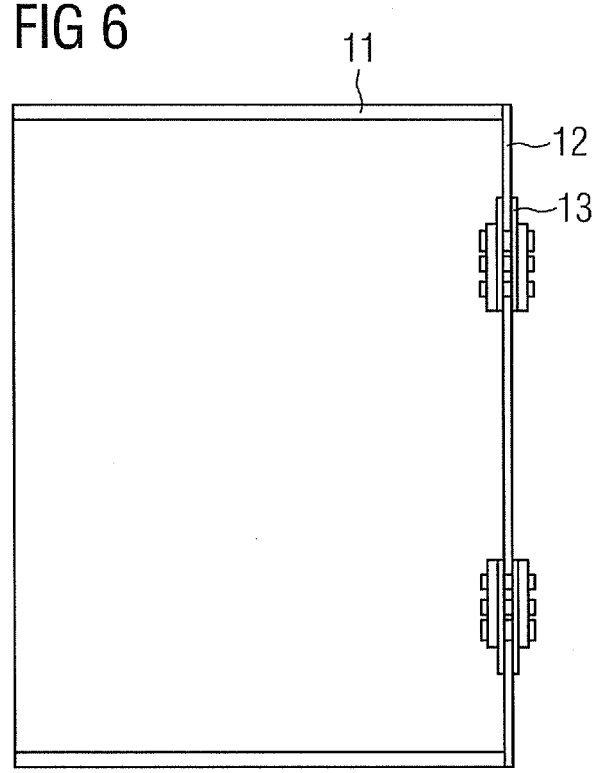
FIG. 6 schematically shows part of the outer rotor portion in a neutral state in a sectional, side view.
Figure 7:
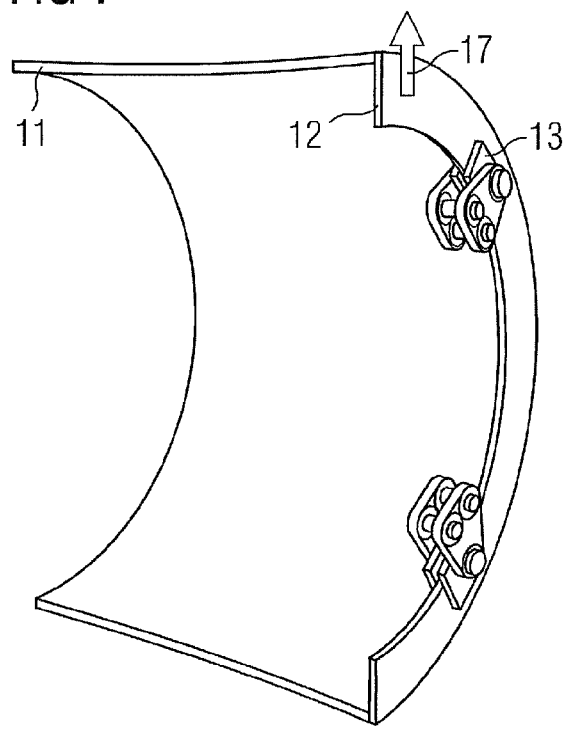
FIG. 7 schematically shows part of the outer rotor portion in a thermal expanded state in a perspective view.
Figure 8:
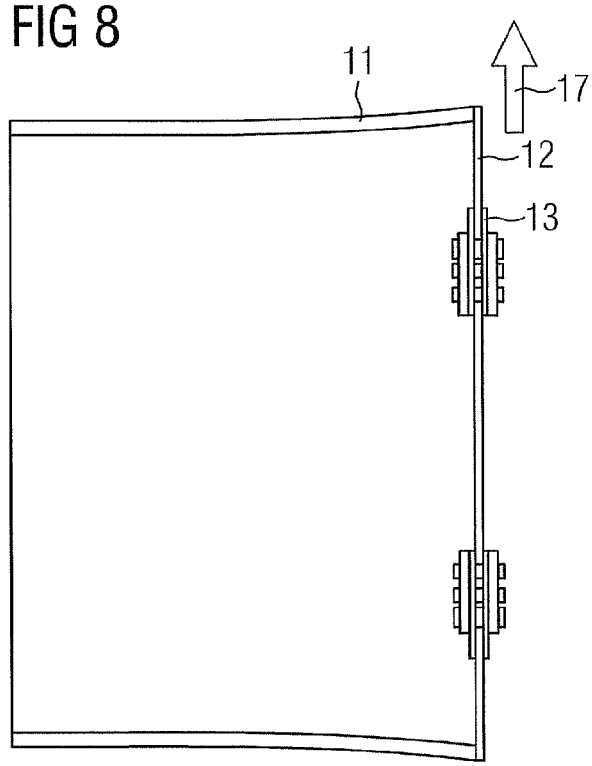
FIG. 8 schematically shows part of the outer rotor portion in a thermal expanded state in a sectional, side view.

FIG. 5 and FIG. 6 show the outer rotor portion 11 and the brake calliper system 13 of FIG. 2 in a neutral state in a perspective view and in a side view, respectively. FIG. 7 and FIG. 8 show the outer rotor portion 11 with the brake calliper system 13 in a thermal expanded state in a perspective view and in a side view, respectively. During operation of the generator a thermal expansion of the brake disc 12 takes place. Due to a temperature difference between the brake disc 12 and the outer rotor portion 11 or any other adjacent structure element, reaction forces act on the outer rotor portion 11, more precisely at the joint between the outer rotor portion 11 and the brake disc 12. The reaction force is designated by an arrow 17. Coursed by the reaction force 17 the outer rotor portion 11 in FIG. 7 and FIG. 8 is deformed compared with the outer rotor portion 11 in FIGS. 5 and 6. The deformation and the expansion is exaggerated in the Figures to demonstrate the principle.

Figure 3:
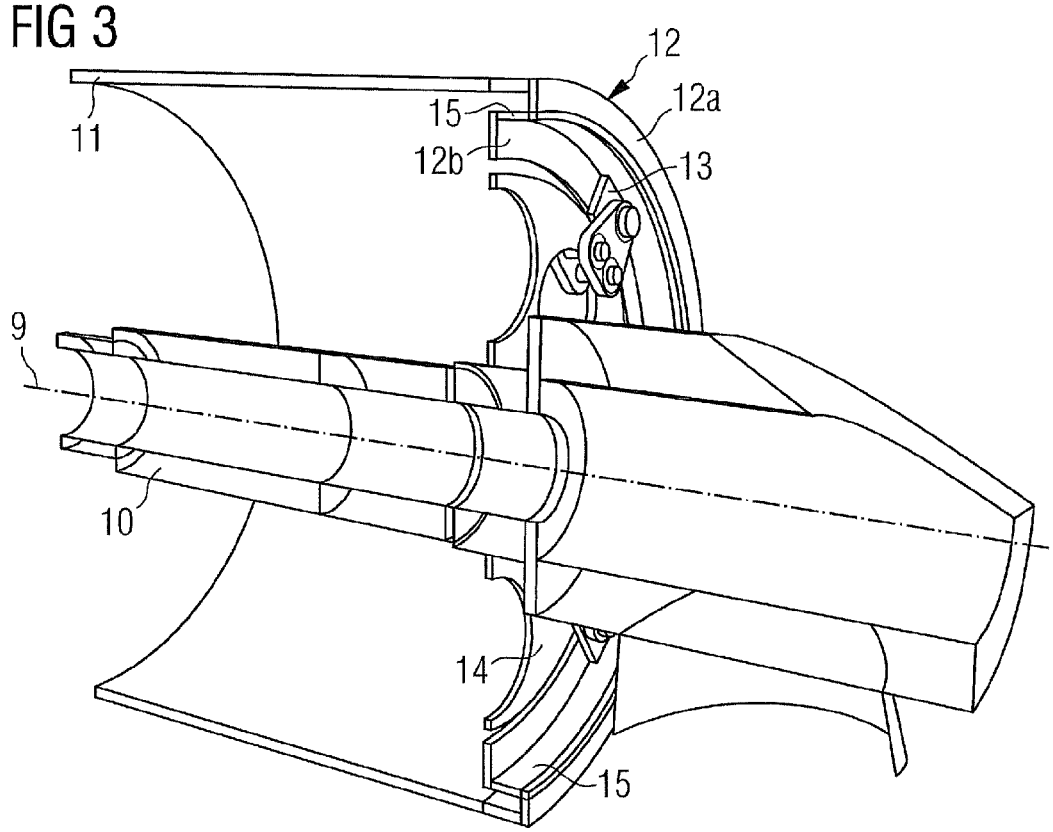
FIG. 3 schematically shows part of an inventive brake system in a perspective, sectional view.

FIG. 3 schematically shows part of an inventive brake system in a perspective view. The inventive brake system comprises a brake disc 12 with an integrated flexible portion 15.

The brake disc 12 in FIG. 3 comprises a first part 12a which is connected to the outer rotor portion 11. The brake disc 12 further comprises a second part 12b which is operatively configured for being frictionally engaged by the brake calliper system 13. Moreover, the brake disc 12 comprises a flexible portion 15 which is located between the first part 12a and the second part 12b of the brake disc 12. The functionality of the inventive brake system will now be described with reference to FIGS. 9 to 13.

Figure 9:
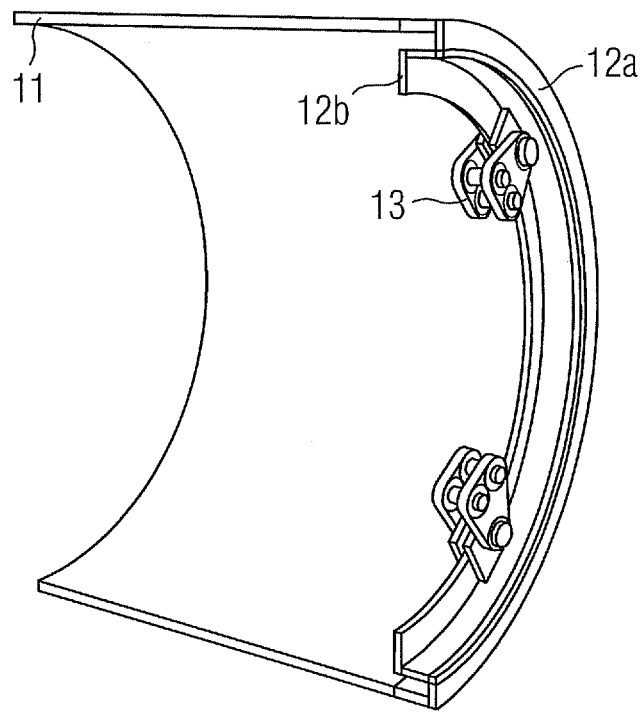
FIG. 9 schematically shows part of the outer rotor portion of an inventive brake system in a neutral state in a perspective view.
Figure 10:
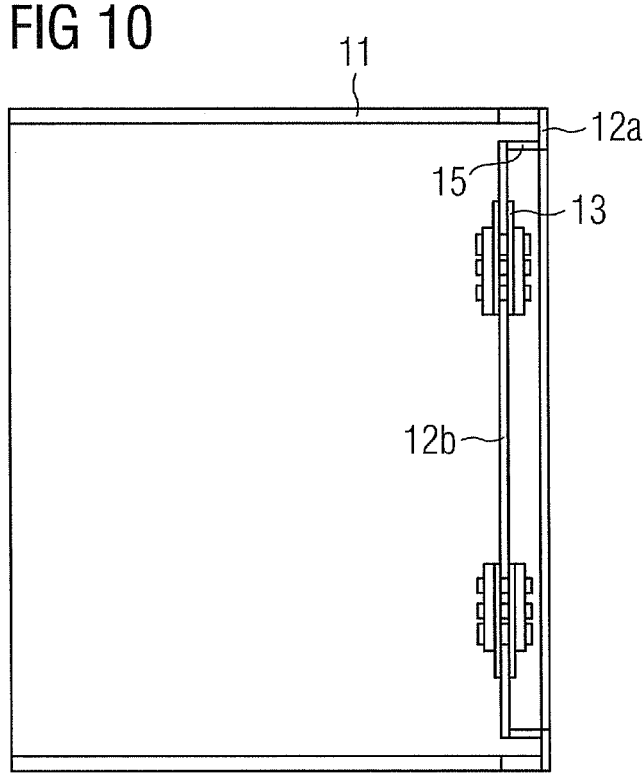
FIG. 10 schematically shows part of the outer rotor portion of an inventive brake system in a neutral state in a sectional, side view.
Figure 11:
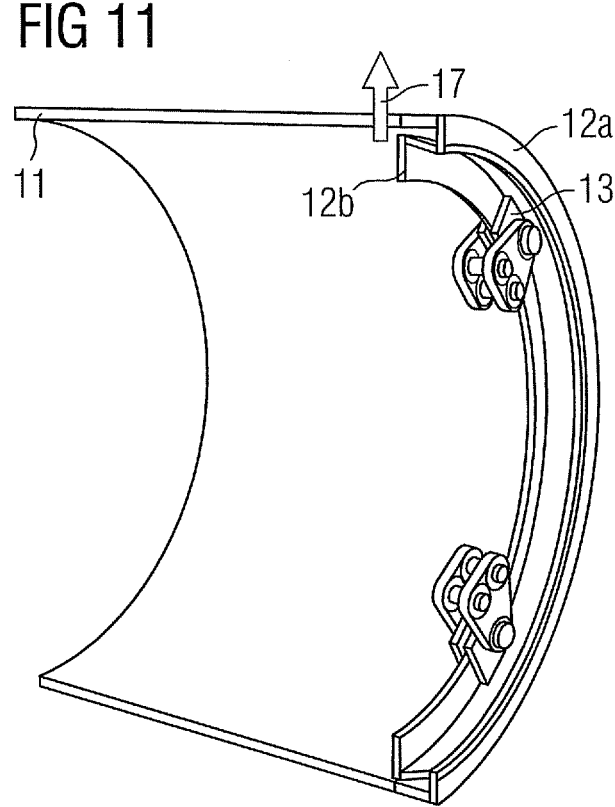
FIG. 11 schematically shows part of the outer rotor portion of an inventive brake system in a thermal expanded state in a perspective view.
Figure 12:
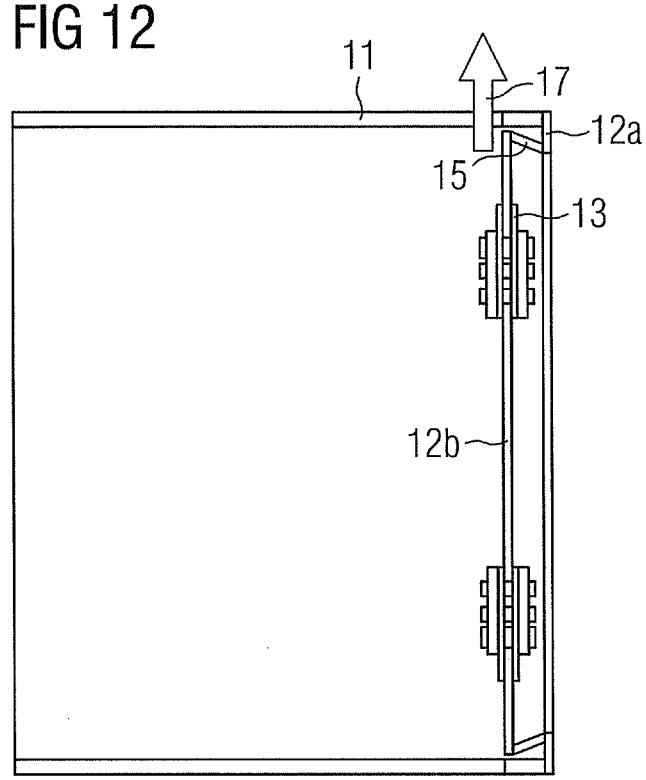
FIG. 12 schematically shows part of the outer rotor portion of an inventive brake system in a thermal expanded state in a sectional, side view.
Figure 13:
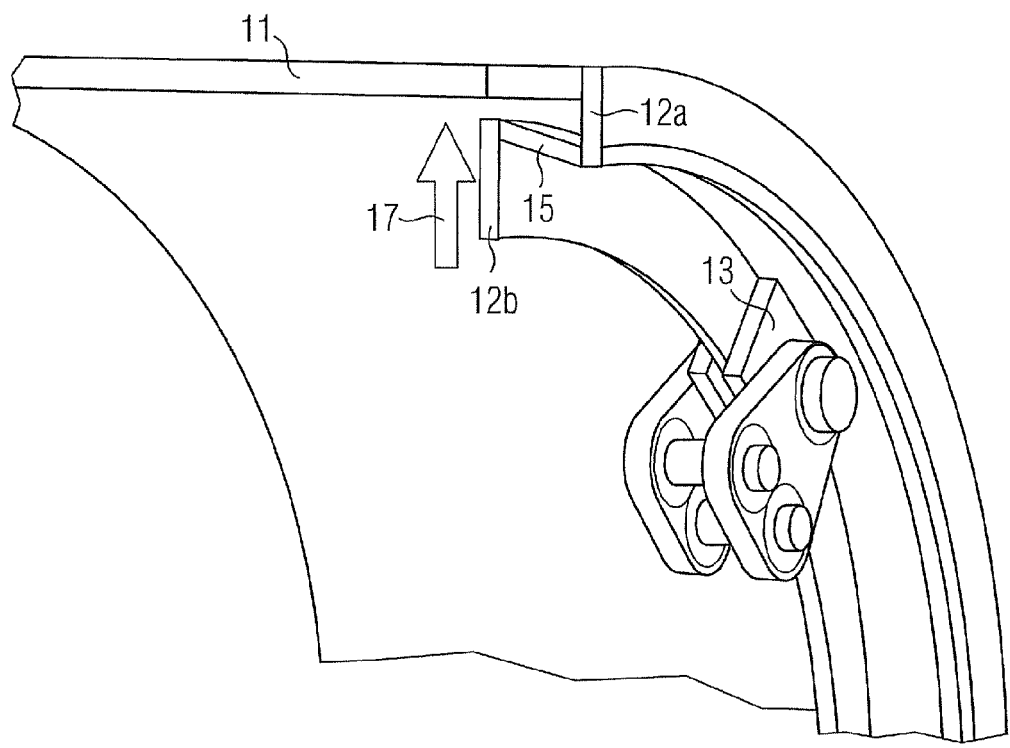
FIG. 13 schematically shows part of the outer rotor portion of an inventive brake system in a thermal expanded state in a perspective view.

FIGS. 9 and 10 schematically show part of the outer rotor portion 11 of the inventive brake system in a neutral state in a perspective view and in a side view, respectively. FIGS. 11 and 12 schematically show the outer rotor portion 11 of the inventive brake system in a state where the brake disc 12 is thermally expanded. FIG. 11 shows a perspective view and FIG. 12 shows a side view. The reaction force coursed by the thermal expansion of the brake disc 12 is designated by an arrow 17. FIG. 13 schematically shows an enlarged view of part of FIG. 11. In FIGS. 11 to 13 the flexible portion 15 is deformed compared with the neutral state shown in FIGS. 3, 9 and 10. The outer rotor portion 11 in FIGS. 11 to 13 is not deformed, compared with the situation in FIGS. 7 and 8. This means that the reaction forces 17 coursed by thermal expansion of the brake disc 12 are absorbed in the flexible portion 15 or deformation zone of the brake disc 12. Thus, the flexible portion 15 eliminates or reduces the stress in the disc and in the outer rotor portion or any other adjacent structure, for example generator structures.

A second embodiment of the present invention will now be described with reference to FIGS. 1, 2, 4 to 8 and 14 to 17. Elements correspondent to elements of the first embodiment are designated with the same reference numerals and will not be described in detail again.

Figure 4:
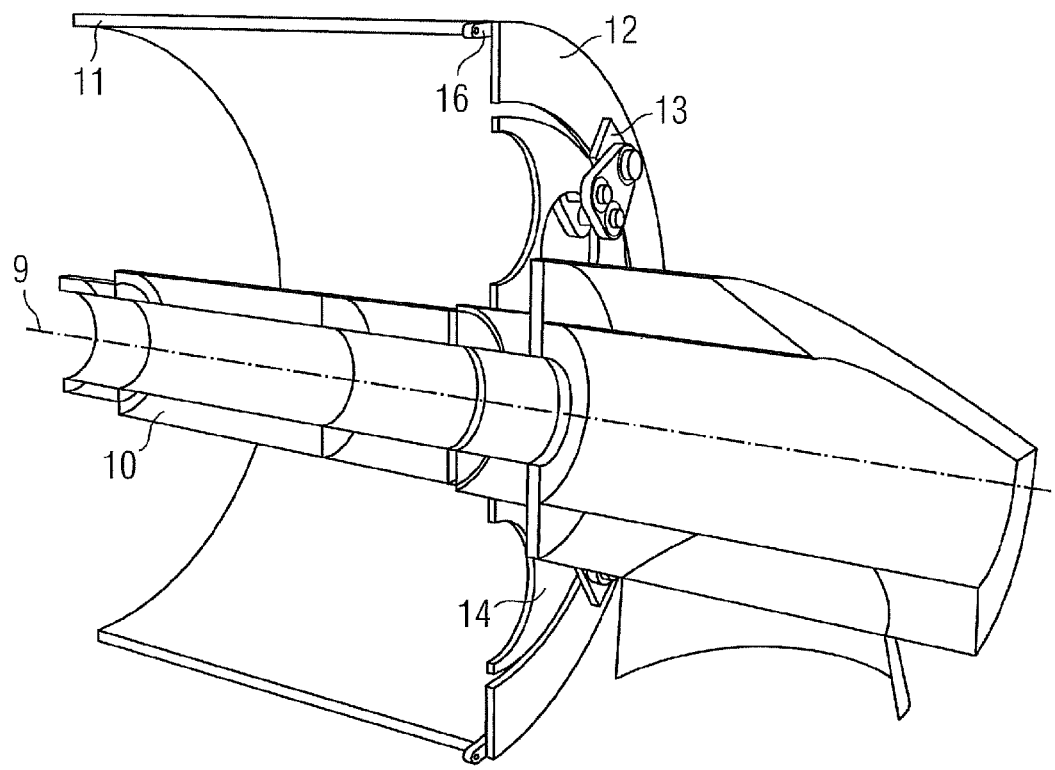
FIG. 4 schematically shows a further variant of part of an inventive brake system in a perspective, sectional view.

FIG. 4 schematically shows part of a second embodiment of an inventive brake system in a perspective view. In FIG. 4 the brake disc 12 is mounted to the outer rotor portion 11 by means of a flexible joint 16. A first side 21 of the flexible joint 16 is connected to the brake disc 12 while a second side 22 of the flexible joint 16 is connected to the outer rotor portion 11.

Figure 14:
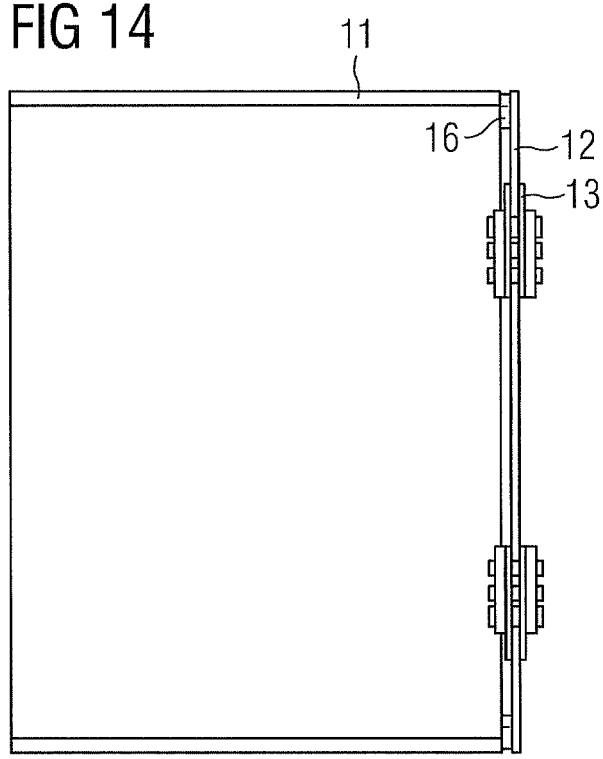
FIG. 14 schematically shows a further variant of the outer rotor portion of an inventive brake system in a neutral state in a sectional, side view.
Figure 16:
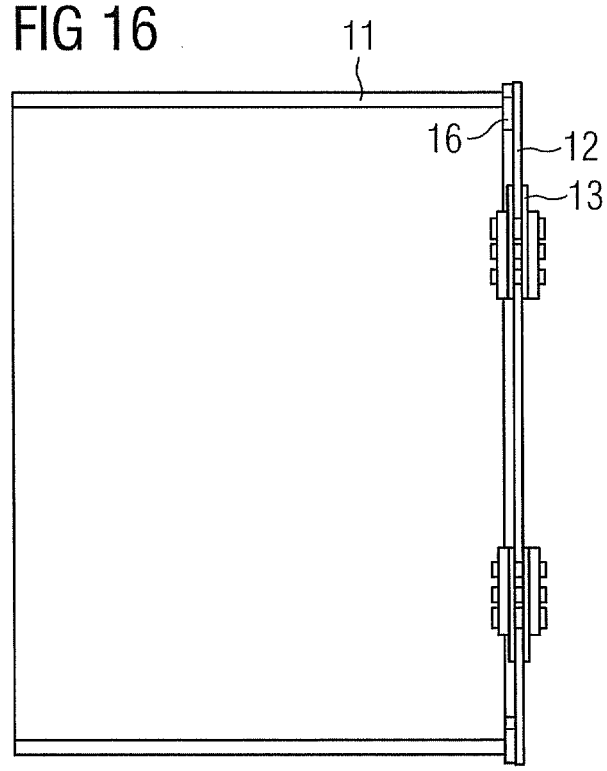
FIG. 16 schematically shows part of the outer rotor portion of the inventive brake system of FIG. 14 in a thermal expanded state in a sectional, side view.

FIGS. 14 and 15 schematically show the second embodiment of the inventive brake system in a neutral state in a side view and in a perspective view, respectively. FIGS. 16 and 17 schematically show part of the inventive brake system of the second embodiment in a thermal expanded state in a side view and in a sectional view, respectively. In FIGS. 16 and 17 compared with FIGS. 14 and 15 the thermal expansion of the brake disc 12 does not course reaction forces 17 acting on the outer rotor portion 11. In FIGS. 16 and 17 the outer rotor portion 11 is not deformed. The brake disc 12 is expanded and the flexible joint 16 has absorbed the thermal expansion of the brake disc 12, for example by moving or rotating. For example, the first side 21 of the flexible joint 16 can be connected to the brake disc 12 such that a movement or a rotation between the flexible joint 16 and the brake disc 12 is possible. Moreover, the second side 22 of the flexible joint 16 can be connected to the outer rotor portion 11 such that also a movement or a rotation between the flexible joint 16 and the outer rotor portion 11 is possible.

In the FIGS. 14 to 17 the expansion of the brake disc 12 is exaggerated to demonstrate the principle.

The inventive brake system of both embodiments can be connected to the generator 6 or to the hub 4 of the wind turbine 1. The features of both embodiments can be combined, for example such that the brake disc 12 is connected to an adjacent element by means of a flexible joint 16 and further comprises a flexible portion 15.

The invention claimed is:

1. A brake system, comprising:
   a brake disc;
   a rotor assembly which comprises a rotor yoke; and
   a flexible joint for absorbing a thermal expansion of the brake disc, the flexible joint includes a first end rotatably connected to the rotor yoke and includes a second end rotatably connected break disk,
   wherein the thermal expansion of the brake disk is absorbed by a rotation at the first end and/or at the second end.

2. The brake system as claimed in claim 1, wherein the brake system further comprises a stator assembly and a rotation axis.

3. The brake system as claimed in claim 2, wherein the rotor assembly comprises an outer portion which is located radially outward of the stator assembly, and wherein the outer portion comprises the brake disc and the stator assembly comprises a frictional member configured for frictionally engaging at least a portion of the brake disc.

4. The brake system as claimed in claim 3, wherein the frictional member comprises a brake calliper.

5. The brake system as claimed in claim 3, wherein the brake disc extends radially inward from the outer portion of the rotor assembly to the rotation axis.

6. The brake system as claimed in claim 3, wherein the stator assembly comprises a stationary shaft and the frictional member is connected to the stationary shaft.

7. The brake system as claimed in claim 3, wherein the frictional member extends radially outward from the stationary shaft.

8. The brake system as claimed in claim 3, wherein the frictional member comprises a brake calliper on each side of the brake disc.

9. A generator for a wind turbine, comprising:
   a brake system as claimed in claim 1.

10. A wind turbine, comprising:
    a tower;
    a nacelle located on top of the tower;
    a hub mounted to the nacelle; and
    a generator as claimed in claim 9, the generator located inside the nacelle.

11. The wind turbine as claimed in claim 10, wherein the brake system is connected to the generator and/or to the hub.

12. The wind turbine as claimed in claim 10, wherein the brake system is connected to the generator and/or to the hub.

* * * * *